May 22, 1956 P. B. WEISZ 2,746,935
PROCESS FOR DRYING INORGANIC HYDROGELS PARTICLES
Filed April 9, 1951
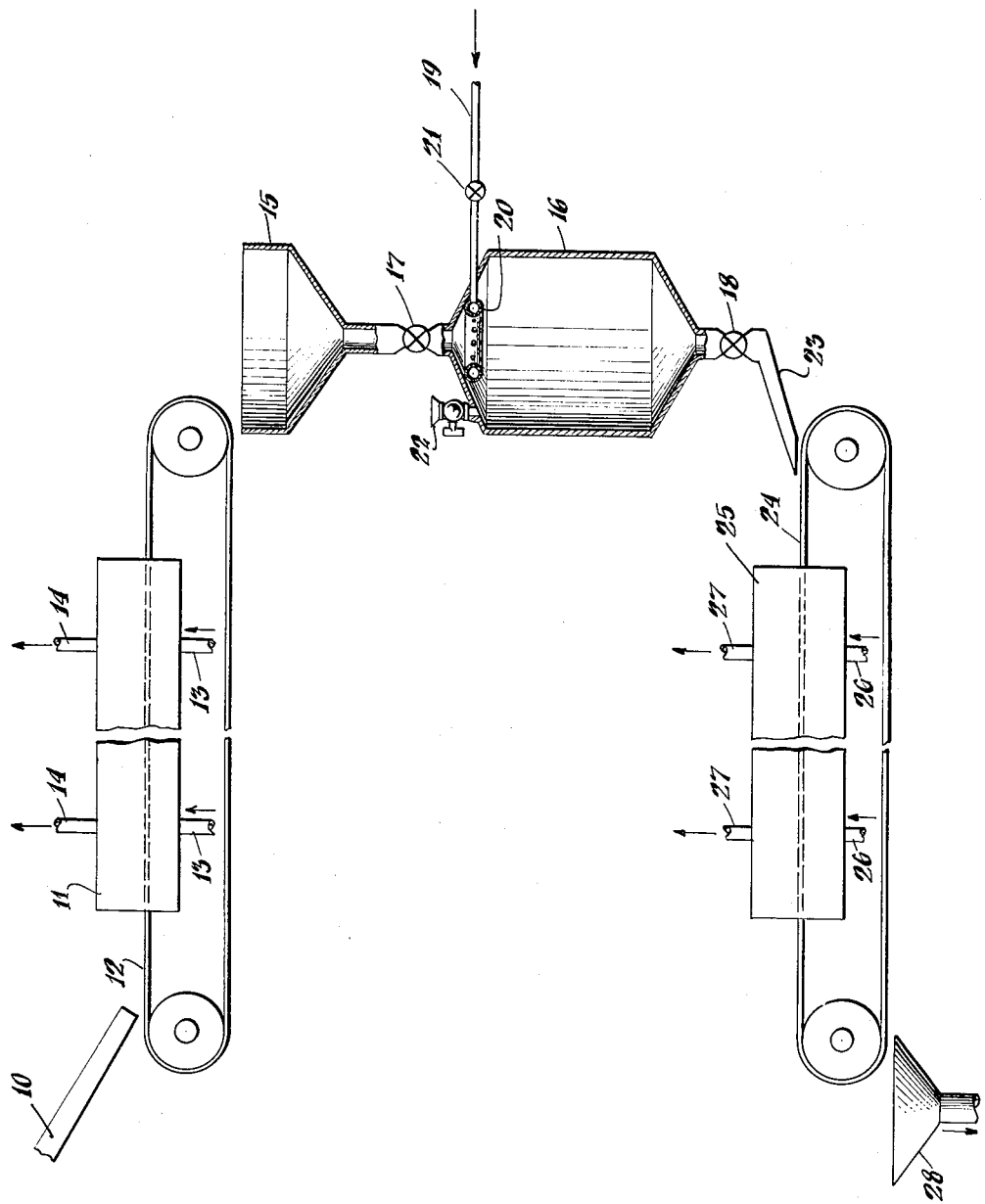
INVENTOR.
Paul B. Weisz
BY Raymond W. Barclay
ATTORNEY United States Patent Office 2,746,935
Patented May 22, 1956

2,746,935

PROCESS FOR DRYING INORGANIC HYDROGELS PARTICLES

Paul B. Weisz, Pitman, N. J., assignor to Socony Mobil Oil Company, Inc., a corporation of New York Application April 9, 1951, Serial No. 220,039

8 Claims. (Cl. 252—448)

This invention relates to a method for drying hydrogels and more particularly is concerned with the removal of water from inorganic hydrogel particles where it is desired to retain the form of the particles.

In recent years, considerable interest has developed in the manufacture of inorganic oxide gels as spheres primarily because of the advantages inherent in this type of physical form. A number of processes for making spherical gel particles have been described in the prior art such as, for example, the method of Marisic set forth in U. S. Patent 2,384,946. Briefly, this method involves the preparation of a gelable inorganic oxide hydrosol characterized by a relatively short time of gelation. The hydrosol is admitted in the form of separate globules to a body of oil or other water-immiscible fluid in which the globules assume a spheroidal shape and set to a hydrogel. Upon being dried, preferably after thorough washing to remove water-soluble matter, the globules shrink to hard, glassy beads of generally spheroidal form. The extent of drying will depend somewhat on the use which it is desired to make of the product but, in any event, the drying is carried to a stage beyond that at which maximum shrinkage of the gel is obtained. In the usual operation, further drying proceeds after syneresis or shrinkage has been virtually completed until the gel particles are substantially dry; that is, the gel possesses open pores free of liquid although it still contains a relatively small percentage of strongly absorbed water which may be removed by drying at relatively high temperatures.

One of the difficulties encountered in the formation of spherical gel particles has been the large loss of particles due to shattering during the drying operation. This shattering apparently results from internal stresses which develop within the spherical particles as the liquid phase is removed. Thus, fracture of the drying particles may produce losses well over 50 per cent of the processed beads utilizing drying techniques well adapted to the drying of many fragile substances.

It has been observed in operation that practically all of the shattering and breakage of spherical gel particles takes place during the final drying stages after shrinkage of the gel is substantially complete. The first stage of drying accordingly involves shrinkage of the spherical gel particles accompanied by a considerable volume decrease. Shattering or breakage of the gel particles during this stage is substantially nil. In the subsequent drying stages during which the gel particles undergo virtually no further volume change, the usually encountered breakage occurs.

It has now been found that good yields of perfect beads may be obtained by drying the hydrogel at approximately atmospheric pressure in a stream of warm gas until shrinkage of the gel particles is substantially complete and thereafter exposing the shrunken particles to steam under high temperature and pressure conditions. The beads, after being subjected to the steam treatment, may then be dried to the desired extent at atmospheric pressure with a stream of warm gas.

It has been found that by utilizing the process of this invention the yield of sound beads is substantially 100 per cent and that breakage or shattering during the drying operation is accordingly practically eliminated.

The initial drying of the hydrogel particles is carried out at substantially atmospheric pressure by passing a warm gas, such as air, nitrogen, steam, or other inert gas through a bed of the hydrogel particles. The temperature of the drying gas will ordinarily be in the range of about 210 to about 350° F. This initial drying continues until shrinkage of the gel particles is substantially complete. The shrunken gel particles are then passed into a zone of high temperature and pressure, being exposed to the action of steam for a suitable period of time to accomplish the object of subsequent non-breakage of the gel particles. The variables of vapor pressure, temperature, and treating time during the period of exposure to steam are interrelated. The particular conditions of steam treatment employed will thus vary, depending upon the characteristics desired in the final gel product. However, under the usual conditions of operation, the pressure during steam treating is within the approximate range of 250 to 3000 pounds per square inch. The temperature during treatment will ordinarily be within the range of about 400 to about 900° F. and the treating times will generally lie within the range of ¼ to 6 hours. Preferably, treatment in the foregoing temperature and pressure ranges will be carried out for at least one hour. After exposure to the influence of high pressure steam maintained at an elevated temperature, remaining water, if any, is removed from the gel particles by continuing the usual drying operation under conditions substantially identical with those employed during initial drying.

While superheated steam has heretofore been described as a drying gas for effecting removal of water from hydrogel particles while reducing breakage thereof, air or other inert gas may, in accordance with the present procedure, be used during the initial and final drying operations without causing breakage or shattering of the gel particles so treated. Likewise, improvement in the yield of unbroken gel particles is attained by initially drying with steam at atmospheric pressure until shrinkage of the gel particles is substantially complete and thereafter subjecting the shrunken gel particles to steam under the high pressure and temperature conditions set forth above.

The improvement realized by the process of this invention will be apparent when it is considered that drying of the gel particles by the use of an air stream yields only about 50 per cent sound beads. Drying with superheated steam at atmospheric pressure increases the yield of sound beads to approximately 90 per cent. In accordance with the procedure of this invention, approximately 100 per cent yield of sound beads is obtained by interrupting the drying operation after shrinkage of the gel particles is substantially complete, subjecting the shrunken particles to an intermediate procedural step involving treatment of the particles with steam under high pressure and temperature conditions and thereafter continuing the drying operation under normal conditions to yield gel particles of a pre-determined moisture content.

The objects and advantages of the invention will further be apparent from a consideration of the annexed drawing illustrating in diagrammatic form a continuous apparatus suited to the purposes of the invention.

Referring particularly to the drawing, it will be seen that hydrogel globules are supplied by a trough 10 to a continuous belt drier comprising an elongated chamber 11 through which passes a porous belt 12. Drying gas is supplied by inlets 13, and exhaust gas is withdrawn by pipes 14 from the drying chamber. The temperature of the drying gases and the speed of the belt are so controlled that the gel particles are dried to an extent of substantially complete shrinkage before dropping from the end of belt 12 into a hopper 15. The shrunken gel particles then pass by gravity from hopper 15 into a high pressure vessel 16. Valves 17 and 18 are then closed and water is introduced through conduit 19 and passes through a sprayer 20 into the interior of vessel 16. Valve 21 of conduit 19 is then closed and vessel 16 is heated by electrical or other suitable means to the desired temperature. The amount of water introduced into the vessel is such as to afford the desired pressure upon vaporization. The extent of treatment will depend upon the temperature and pressure used as well as the properties desired in the final product. However, a treating time of at least 15 minutes will generally be necessary to afford a substantially 100 per cent yield of unbroken gel particles. After the steam treatment has been completed, valve 22 is opened, allowing steam pressure to escape. Thereafter, control valve 18 is opened and the steam-treated gel particles pass from vessel 16 through conduit 23 onto a moving belt 24. They then pass through a heating chamber 25. Drying gas is supplied to said chamber through inlets 26 and the exhaust gas is withdrawn therefrom through outlets 27. The temperature of the drying gases and the speed of the moving belt is regulated so as to control the removal of remaining mixture from the gel particles to a predetermined degree. The dried gel particles drop from moving belt 24 into hopper 28.

The following examples will serve to illustrate the advantages obtained in accordance with the present process without limiting the same.

Example 1

A silica-alumina hydrosol was prepared by mixing 1.00 volume of a solution of sodium silicate containing 157.0 grams of $SiO_2$ per liter with 1.00 volume of a solution containing 39.79 grams of aluminum sulfate and 31.51 grams of sulfuric acid per liter. The resulting colloidal solution was ejected from a nozzle in the form of globules into a column of gas oil, the depth of which was 8 feet. The globules of solution fell through the oil and gelled before passing into a layer of water located beneath the oil. The time of gelation for the concentrations and proportions of reactants given above was about 4 seconds. The spherical particles of hydrogel were conducted out of the bottom of the column into a stream of water and, on removal from the water, base-exchanged with an aqueous solution of aluminum sulfate and water-washed.

A batch of about 100 of the hydrogel beads was dried at about 268° F. at atmospheric pressure in a stream of air until shrinkage thereof was complete. Before entering the last phase of the drying operation, characterized by whiteness of appearance, the beads were placed in a 200 cc. bomb together with an excess of 35 cubic centimeters of liquid water contained in a small beaker. The bomb was closed and heated to a temperature of 467° F., at which temperature the internal pressure was about 500 pounds per square inch. The heating was carried out for 3 hours, the temperature being kept at the aforesaid maximum for one hour. The bomb was then cooled to room temperature and the steam-treated beads were then removed and dried with warm air at atmospheric pressure at a temperature of about 268° F. until the moisture content of the beads was about 6 to 8 per cent by weight. None of the beads cracked or fractured during the drying operation.

Example 2

A batch of about 95 of the beads prepared by the process of Example 1 was dried at atmospheric pressure at about 268° F. in a stream of air until they had shrunken and hardened. The beads were then placed in a 200 cc. bomb, together with an excess of about 35 centimeters of liquid water. The bomb was closed and heated to 470° F., at which temperature the internal pressure was 505 pounds per square inch. The heat extended over a period of 3 hours, the temperature being kept at the above maximum for one hour. The bomb was then cooled to room temperature over several hours. The beads were then removed and placed back into the normal drying operation involving the passage of warm air at atmospheric pressure over the beads until the moisture content thereof was reduced to about 6 to 8 per cent by weight. Approximately 100 per cent of unbroken dry beads were obtained as a result of the above drying procedure.

The following examples carried out by a process similar to that of Example 2 and the results thereby obtained are tabulated below:

| Example | Quantity of Beads Charged | Conditions of Contact | | Result—Quantity of Unbroken Beads |
|---|---|---|---|---|
| | | Pressure | Temp., ° F., max. | |
| | Cc. | | | Percent |
| 3 | 250 | 520 | 470 | 99 |
| 4 | 200 | 710 | 525 | 96 |
| 5 | 250 | 720 | 525 | [1] 100 |

[1] This run was "vented" after treating time, and during the cooling operation, so as to dry beads in situ, without a separate drying operation.

From the foregoing results, it will be evident that the process of this invention provides an improved method for drying hydrogel particles without effecting breakage thereof. The results obtained by the procedure of this invention are deemed to be particularly unexpected in view of the fact that drying of the hydrogel particles in warm air or steam at atmospheric pressure resulted in a considerable breakage of up to 50 per cent or more of the beads. Likewise, drying of the beads with steam at pressures in excess of 150 pounds per square inch resulted in a badly broken and shattered gel product. In accordance with the method described herein, the hydrogel particles are dried at atmospheric conditions by any feasible means; generally, by passing a warm gas therethrough until shrinkage of the gel particles is substantially complete. Usually this will take place when approximately 70 per cent of the free water has been removed from the hydrogel. After shrinkage of the hydrogel particles has been attained, the shrunken particles are then subjected to steam under conditions of elevated temperature and high pressure for a suitable period of time and thereafter remaining moisture from the steam-treated particles may be removed at atmospheric conditions by any feasible means, generally by again passing a warm gas through the particles.

I claim:

1. A process for drying inorganic hydrogel particles, which comprises passing a stream of warm gas at atmospheric pressure in contact with said particles until shrinkage thereof is substantially complete, at which point the hydrogel contains approximately 30 per cent of its initial water content, exposing the shrunken particles so obtained to an atmosphere of steam at a pressure of at least about 250 but not more than about 3000 pounds per square inch and a temperature of at least about 400° F. but not more than about 900° F. for a period of at least about 1 hour but not more than about 6 hours, and thereafter completing drying of the particles to a desired moisture content with warm gas at substantially atmospheric pressure.

2. A process for drying inorganic hydrogel particles, which comprises passing a stream of warm gas at atmospheric pressure in contact with said particles until shrinkage thereof is substantially complete, at which point the hydrogel contains approximately 30 per cent of its initial water content, exposing the shrunken particles so obtained to an atmosphere of steam at a pressure of between about 250 and about 3000 pounds per square inch and a temperature of between about 400 and about 900° F. for a period of between about 15 minutes and about 6 hours, and thereafter completing drying of the particles to a desired moisture content with warm gas at substantially atmospheric pressure.

3. A process for drying inorganic hydrogel particles, which comprises passing a stream of gas at a temperature of between about 210 and about 350° F. and at atmospheric pressure in contact with said particles until shrinkage thereof is substantially complete, at which point the hydrogel contains approximately 30 per cent of its initial water content, exposing the shrunken particles so obtained to an atmosphere of steam at a pressure of between about 250 and about 3000 pounds per square inch and a temperature of between about 400 and about 900° F. for a period of between about 15 minutes and about 6 hours, and thereafter completing drying of the particles to a desired moisture content with warm gas at substantially atmospheric pressure.

4. A process for the manufacture of inorganic oxide gel in the form of hard, glassy spheroidal particles, which comprises causing gelation of globules of inorganic oxide hydrosol in a body of a water-immiscible liquid, washing the resultant spheroidal particles of hydrogel to remove water-soluble matter therefrom and thereafter drying said hydrogel particles to remove the liquid phase therefrom by passing warm gas at substantially atmospheric pressure in contact with said particles until shrinkage thereof is substtantially complete, at which point the hydrogel contains approximately 30 per cent of its initial water content, exposing the shrunken particles so obtained to an atmosphere of steam at a pressure of at least about 250 but not more than about 3000 pounds per square inch and a temperature of at least about 400° F. but not more than about 900° F. for a period of at least about 1 hour but not more than about 6 hours, and thereafter completing drying of the particles to a predetermined moisture content with warm gas at substantially atmospheric pressure, whereby the liquid phase of the hydrogel is substantially removed while retaining said spheroidal shape of said particles.

5. A process for the manufacture of inorganic oxide gel in the form of hard, glassy spheroidal particles, which comprises causing gelation of globules of inorganic oxide hydrosol in a body of a water-immiscible liquid, washing the resultant spheroidal particles of hydrogel to remove water-soluble matter therefrom and thereafter drying said hydrogel particles to remove the liquid phase therefrom by passing warm gas at substantially atmospheric pressure in contact with said particles until shrinkage thereof is substantially complete, at which point the hydrogel contains approximately 30 per cent of its initial water content, exposing the shrunken particles so obtained to an atmosphere of steam at a pressure of between about 250 and about 3000 pounds per square inch and a temperature between about 400° F. and about 900° F. for a period of between about 15 minutes and about 6 hours and thereafter completing drying of the particles to a pre-determined moisture content with warm gas at substantially atmospheric pressure, whereby the liquid phase of the hydrogel is substantially removed while retaining said spheroidal shape of said particles.

6. A process for the manufacture of inorganic oxide gel in the form of hard, glassy spheroidal particles, which comprises causing gelation of globules of inorganic oxide hydrosol in a body of a water-immiscible liquid, washing the resultant spheroidal particles of hydrogel to remove water-soluble matter therefrom and thereafter drying said hydrogel particles to remove the liquid phase therefrom by passing a stream of warm gas at a temperature of between about 210 and about 350° F. at atmospheric pressure in contact with said particles until shrinkage thereof is substantially complete, at which point the hydrogel contains approximately 30 per cent of its initial water content, exposing the shrunken particles so obtained to an atmosphere of steam at a pressure of between about 250 and about 3000 pounds per square inch and a temperature of between about 400 and about 900° F. for a period of between about 15 minutes and about 6 hours and thereafter completing drying of the particles to a predetermined moisture content with gas at a temperature of between about 210 and about 350° F. at substantially atmospheric pressure, whereby the liquid phase of the hydrogel is substantially removed by retaining said spheroidal shape of said particles.

7. In the process of drying inorganic hydrogel particles with warm gas at substantially atmospheric pressure to hard porous gel, the improvement which comprises interrupting the drying operation when shrinkage of the hydrogel particles is substantially complete, at which point the hydrogel particles contain approximately 30 per cent of their initial water content, and exposing the particles at this stage of drying to steam at a pressure of at least about 250 but not more than about 3000 pounds per square inch and a temperature of at least about 400° F. but not more than about 900° F. for a period of at least about 1 hour but not more than about 6 hours.

8. In the process of drying inorganic hydrogel particles with warm gas at substantially atmospheric pressure to hard porous gel, the improvement which comprises interrupting the drying operation when shrinkage of the hydrogel particles is substantially complete, at which point the hydrogel particles contain approximately 30 per cent of their initial water content, and exposing the particles at this stage of drying to steam at a pressure between about 250 and about 3000 pounds per square inch and a temperature of between about 400 and about 900° F. for a period of not less than about 15 minutes and not more than about 6 hours.

References Cited in the file of this patent

UNITED STATES PATENTS

| Number | Name | Date |
| --- | --- | --- |
| 1,762,228 | Holmes | June 10, 1930 |
| 1,772,055 | Miller et al. | Aug. 5, 1930 |
| 2,249,767 | Kistler | July 22, 1941 |
| 2,273,350 | Fry et al. | Feb. 17, 1942 |
| 2,378,155 | Newsome et al. | June 12, 1945 |
| 2,384,946 | Marisic | Sept. 18, 1945 |
| 2,397,350 | Hayden et al. | Mar. 26, 1946 |
| 2,400,907 | Behrman | May 28, 1946 |
| 2,698,305 | Plank et al. | Dec. 28, 1954 |